3,057,802
MAGNETIC MATERIALS OF THE HIGH PERMEABILITY FERRITE TYPE

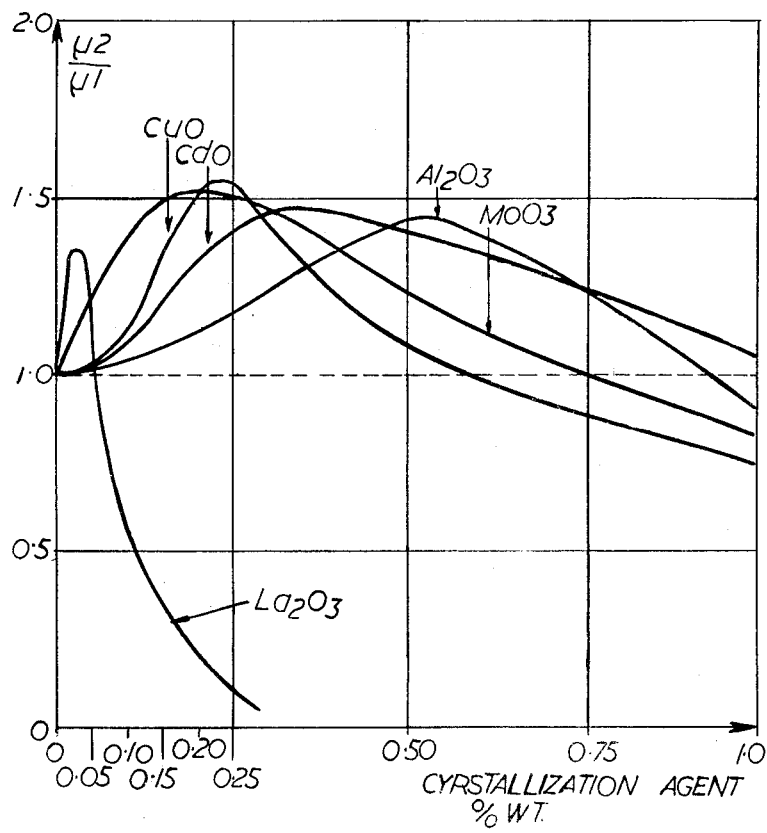
FIG. I.

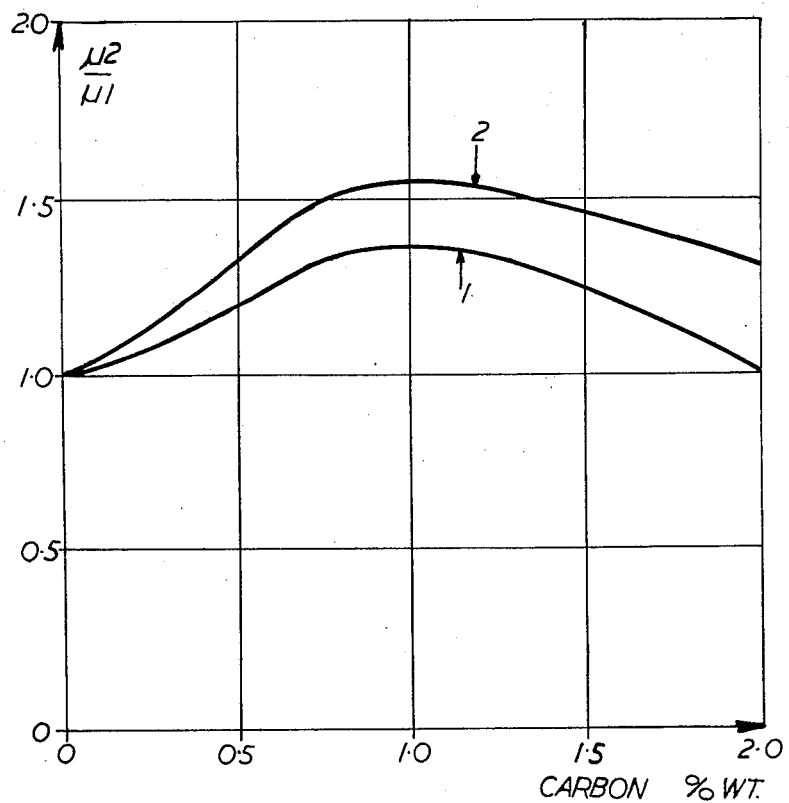

Andre Pierrot and Yves Lescroel, Conflans Sainte-Honorine, France, assignors to Lignes Telegraphiques et Telephoniques, Paris, France, a French company
Filed Feb. 5, 1959, Ser. No. 791,405
Claims priority, application France Feb. 13, 1958
2 Claims. (Cl. 252—62.5)

The present invention relates to ferro-magnetic materials of the "ferrite" type, for use in the art of telecommunications, electronics and electrotechnics for transformer cores, inductance coils and any other application for which it is necessary to have a soft magnetic material with high permeability and low losses.

The definitions of the co-efficients employed to characterise the magnetic materials obtained in accordance with the invention are given in the following:

The permeability $\mu$ indicated is the permeability measured for a field of 2 millioersteds, i.e. the "initial" permeability for a frequency of 800 c./s. at the temperature of 20° C.

The coefficients of losses employed are the coefficients defined for a frequency of 800 c./s., a field of 1 ampere-turn per centimetre, and an inductance of 1 henry at the temperature of 20° C., in accordance with the relation:

$$R_p = F_n \cdot \frac{f^2}{800} \cdot L + h \cdot \frac{N.I.}{lnm} = \frac{f}{800} \cdot L + t \cdot \frac{f}{800} \cdot L \quad (1)$$

in which:

$R_p$ is the resistance of losses in alternating current in the magnetic core of an inductance coil, in ohms.
L is the inductance of said coil in henrys:
$f$ is the frequency, in cycles per second;
N is the number of turns of the winding of the coil;
I is the effective value of the current in the winding, in amperes;
$lnm$ is the length of the mean magnetic line of force, in cm.

The coefficients of eddy current losses $F_n$, hyteresis $h$ and of "trainage" $t$ relating to a continuous magnetic circuit, have been measured under the following conditions:

The coefficient of eddy current losses $F_n$, is expressed in ohms per henry, for the frequency 800 c./s., measured for a field of 2 millioersteds and at a temperature of about 20° C., for magnetic circuits of which the cross-section is about 0.3 cm.² (0.5×0.6 cm.);

The coefficient of hysteresis losses $h$, expressed in ohms per henry, for a field of $$\frac{N.I.}{lnm} = 1 A.t/cm.$$

and for the frequency $f=800$ c./s. is measured between fields of 2 and 22 millioersteds, at the frequency 800 c./s. and at the temperature of approximately 20° C.;

The coefficient of "trainage" losses $t$, expressed in ohms per henry and for the frequency $f=800$ c./s. is deduced from the ordinate at the origin of the curves $$\frac{R_p}{f.L} = F(f)$$

for a zero field, at a temperature of about 20° C. According to (1), in effect, for $f=0$ and $I=0$, we have;

$$\frac{R_p}{f.L} = \frac{t}{800}$$

hence we deduce $t$.

The coefficients $F_n$, $h$ and $t$ indicated relate to continuous circuits without airgap and are of particular interest for transformers without airgap.

The coefficients $$\frac{F_n}{\mu} \cdot 10^3, \frac{h}{\mu^2} \cdot 10^6 \text{ and } \frac{t}{\mu} \cdot 10^3$$

have been introduced, which make it possible to judge the quality of the various materials, and do not depend on the air-gap, if any.

It is, moreover, well known that it is desirable in telecommunication to produce, in as small as possible a volume, transformers with as large as possible a passband, and having a very low attenuation in that band. This necessitates the use of materials with high initial permeability and low losses.

One particular object of the invention is to obtain magnetic materials fulfilling these conditions.

In accordance with the present invention, magnetic materials of the ferrite type are provided, particularly ferrites of manganese-zinc, characterised by the addition to the basic composition of a crystallising agent of which the content is between 0.02 and 2% of the weight of the mixture, which causes the material to have an initial permeability higher than 3000 and which might reach 6000.

In particular, the basic ferrites of manganese-zinc to which the invention relates are ferrites of which the composition comprises a molecular proportion of ferric oxide $Fe_2O_3$ substantially equal to 50%, a content by weight of FeO comprised between 0 and 5%, and molecular proportions of manganese oxide MnO and zinc oxide ZnO, respectively comprised between 25 and 30% and between 15 and 25%, as described and claimed in British Specification 730,703. It has moreover been found that for these materials, for best results, the diameter of the grains must be as uniform as possible and comprised between 10 and 30 microns.

Carbon (C) is used as a crystallizing agent which makes it possible to obtain a very homogeneous granular structure with large grains. Its action, is particularly to reduce the temperature of preparation of the ferrite.

Owing to the fact that, in the starting mixture used in preparing the ferrite, the crystallising agent is introduced into the mixture of oxides, the contents indicated are related to the total mass of the components of the starting mixture, in which iron is considered in the form of $Fe_2O_3$ and the other constituents in the form of MeO, Me representing the bivalent metal or metals.

In order to obtain the permeability claimed, it is very important to use very pure starting raw materials. As is said in the British specification above referred to, the most harmful impurities are barium and strontium.

The invention will be better understood with reference to the drawing and to the following examples:

The FIGURE represents for a given starting composition the curves of variation of the ratio $\mu_2/\mu_1$ as a function of the percentage of carbon added, $\mu_1$ being the initial permeability without the carbon and $\mu_2$ the initial permeability of the material obtained with the addition of carbon.

The figure represents the variation of the ratio $\mu_2/\mu_1$ as a function of the percentage by weight of the crystallisation agent, for a starting composition;

$Fe_2O_3$ _____ 52.5
MnO _____ 28.3
ZnO _____ 19.2 and for annealing for four hours at 1,240° C. in pure nitrogen, containing 1% oxygen, followed by cooling for 15 hours in pure nitrogen.

It will be seen that the permeability is improved up to about 50% of its original value, for certain quantities of crystallisation agent preferably taken within the following value; C: 0.50 to 1.50%.

The figure gives the variation of the ratio $\mu_2/\mu_1$ as a function of the percentage by weight of carbon added to the mixture before grinding.

Curve 1 relates to acetylene black, curve 2 to colloidal graphite in suspension in water.

Besides its role in crystallisation, the carbon also serves as a reducing agent favoring the formation of FeO in the final product.

Moreover, the carbon is totally eliminated at the time of sintering and the chemical analysis indicates that it is only present in traces in the final product.

The following examples, which are given to permit a better understanding of the invention, are not limitative.

The examples given relate to the same composition of the starting mixture without crystallisation agent, that is, in molecular percentages:

Fe$_2$O$_3$ _____ 52.5
MnO _____ 28.3
ZnO _____ 19.2 for all the examples, the treatment is the same as that indicated in the following for the material without crystallisation agent. The crystallisation agent is added to the starting mixture before grinding.

The oxides in the proportions indicated above are ground for from 24 to 28 hours in a steel mill with steel balls, the water added being equal in litres to about 1.5 times the weight of the material in kilogrammes.

The material, after being filtered and dried, is compressed into cores at a pressure of about 1 to 10 tons per cm.$^2$, for example 5 tons per cm.$^2$.

The cores passed into the stove at 200° C. for evaporation of the organic binding agent possibly employed during compression, are annealed in a nitrogen atmosphere containing about 1% oxygen. The temperature is 1,240° C., the duration four hours and the cooling is carried out for about 15 hours in pure nitrogen. The cooling of the annealed substance is extremely important, because it is during this cooling that the excess of trivalent ions of Fe$_2$O$_3$ is transformed into bivalent ions, leading to a material containing as many molecules of trivalent ions as molecules of bivalent ions and having very good magnetic properties.

The material obtained in this way has the following characteristics:

$$\mu = 2,600$$

$$\frac{F_n}{\mu} \cdot 10^3 = 0.5$$

$$\frac{h}{\mu^2} \cdot 10^6 = 200$$

$$\frac{t}{\mu} \cdot 10^3 = 5 \text{ and}$$

Curie point, $\theta_0 \simeq 170°$ C.

*Example 1*

For a product having the starting composition previously indicated, to which has been added 1% by weight of acetylene black, and treated as described, the magnetic properties are as follows:

$$\mu = 3,400$$

$$\frac{F_n}{\mu} \cdot 10^3 = 0.18$$

$$\frac{h}{\mu^2} \cdot 10^6 = 250 \text{ and}$$

$$\frac{t}{\mu} \cdot 10^3 = 2$$

*Example 2*

For a product having the starting composition indicated above, to which has been added 1% by weight of colloidal graphite in suspension in water, and treated in the manner described, the magnetic properties are as follows:

$$\mu = 4,000$$

$$\frac{F_n}{\mu} \cdot 10^3 = 0.23$$

$$\frac{h}{\mu^2} \cdot 10^6 = 200 \text{ and}$$

$$\frac{t}{\mu} \cdot 10^3 = 1$$

For these two examples the excellent values of the coefficient of eddy current losses, hysteresis losses and trainage losses should be noted.

While the principles of the invention have been described above in connection with specific embodiments, and particular modifications thereof, it is to be clearly understood that this description is made only by way of example and not as a limitation on the scope of the invention.

What we claim is:

1. A body of ferromagnetic ceramic material of high permeability which is the reaction product obtained by heating for a period greater than two hours at a sintering temperature above 1170° C. in an atmospheric essentially constituted by an inert gas containing a small amount of oxygen, followed by slow cooling in an inert atmosphere, a mixture of ferric oxide, an oxide of manganese and zinc oxide the starting mixture of oxides and the heat treatment yielding a final material containing between 49.7 and 50.6 mol percent of ferric oxide, between 0.3 and 7.5 mol percent of ferrous oxide, between 25 and 30 mol percent of manganous oxide and the remainder zinc oxide and in which there is added to the starting mixture of oxides between 0.05 and 1.5%, by weight of the mixture, of carbon.

2. A body of ferromagnetic material as defined in claim 1 in which said carbon is added in the form of colloidal graphite suspended in water.

References Cited in the file of this patent

UNITED STATES PATENTS

| | | |
|---|---|---|
| 2,565,861 | Leverenz et al. | Aug. 28, 1951 |
| 2,636,860 | Snoek et al. | Apr. 28, 1953 |
| 2,723,238 | Simpkiss | Nov. 8, 1955 |
| 2,736,708 | Crowley et al. | Feb. 28, 1956 |
| 2,903,429 | Guillaud | Sept. 8, 1959 |
| 2,924,573 | Sasaki et al. | Feb. 9, 1960 |
| 3,009,880 | Lessoff | Nov. 21, 1961 |

FOREIGN PATENTS

| | | |
|---|---|---|
| 1,048,444 | France | Aug. 5, 1953 |
| 1,051,851 | France | Sept. 23, 1953 |
| 1,122,258 | France | May 22, 1956 |
| 1,125,577 | France | July 16, 1956 |
| 1,126,428 | France | July 30, 1956 |
| 1,128,630 | France | Aug. 27, 1956 |
| 713,370 | Great Britain | Aug. 11, 1954 |
| 735,375 | Great Britain | Aug. 17, 1955 |
| 212,980 | Australia | Feb. 19, 1958 |

OTHER REFERENCES

Kordes et al.: Chemical Abstracts, vol. 46, col. 4411, May 1952.